United States Patent
Kimura

(10) Patent No.: US 6,684,012 B2
(45) Date of Patent: Jan. 27, 2004

(54) OPTICAL COMMUNICATION MODULE AND PROCESS FOR PRODUCING THE SAME

(75) Inventor: Naoki Kimura, Tokyo (JP)

(73) Assignee: NEC Corporation, Tokyo (JP)

( * ) Notice: Subject to any disclaimer, the term of this patent is extended or adjusted under 35 U.S.C. 154(b) by 7 days.

(21) Appl. No.: 09/950,766

(22) Filed: Sep. 13, 2001

(65) Prior Publication Data
US 2002/0031307 A1 Mar. 14, 2002

(30) Foreign Application Priority Data
Sep. 13, 2000 (JP) ........................ 2000-278058

(51) Int. Cl.[7] .................... G02B 6/30; G02B 6/26; G02B 6/42
(52) U.S. Cl. ................ 385/49; 385/15; 385/39; 385/50
(58) Field of Search .................... 385/49, 50, 15, 385/39

(56) References Cited

U.S. PATENT DOCUMENTS

| | | | | |
|---|---|---|---|---|
| 4,243,297 A | * | 1/1981 | Elion | 359/127 |
| 4,750,799 A | * | 6/1988 | Kawachi et al. | 385/14 |
| 5,425,118 A | * | 6/1995 | Sugihara et al. | 385/51 |
| 5,479,547 A | * | 12/1995 | Kunikane et al. | 385/47 |
| 5,633,962 A | * | 5/1997 | Kurata | 385/24 |
| 5,799,120 A | * | 8/1998 | Kurata et al. | 385/45 |
| 6,243,516 B1 | * | 6/2001 | Seino | 385/47 |
| 6,374,021 B1 | * | 4/2002 | Nakanishi et al. | 385/49 |
| 6,480,639 B2 | * | 11/2002 | Hashimoto et al. | 385/14 |

FOREIGN PATENT DOCUMENTS

| | | | | |
|---|---|---|---|---|
| JP | 11-68705 | | 3/1999 | |
| JP | 11-352341 | | 12/1999 | |
| JP | 2000249875 A | * | 9/2000 | G02B/6/42 |

* cited by examiner

Primary Examiner—John D. Lee
Assistant Examiner—Daniel Valencia
(74) Attorney, Agent, or Firm—McGinn & Gibb, PLLC

(57) ABSTRACT

An optical communication module for optical signal transmission having a structure adopting folding at a filter and a process for producing the same is disclosed. An optical waveguide is formed as a straight waveguide for send/receive of an optical signal. A groove is formed on the optical waveguide substrate. The groove is preferably a V groove positioned diagonally to the axial center line of the substrate. The V groove is disposed in the same direction as an optical waveguide. The above construction can realize an optical send/receive module, which can eliminate the need to provide a bent waveguide, enables all waveguides to be constructed by a straight waveguide, has a small size, and can realize mass production at low cost.

27 Claims, 8 Drawing Sheets

OPTICAL COMMUNICATION MODULE AND PROCESS FOR PRODUCING THE SAME

FIELD OF THE INVENTION

The invention relates to an optical communication module for optical signal transmission, and more particularly to an optical communication module having a structure adopting folding at a filter and a process for producing the same.

BACKGROUND OF THE INVENTION

A conventional optical communication module having a structure adopting folding at a filter is disclosed, for example, in Japanese Patent Laid-Open No. 068705/1999. This module is shown in FIG. 1.

Japanese Patent Laid-Open No. 068705/1999 proposes that, in the optical communication module utilizing two-way WDM (wavelength division multiplexing), a groove is provided in a silicon substrate and a dielectric multilayer film filter is inserted into the groove with a view to reducing crosstalk light, which has leaked from LD (laser diode) light into PD (photodiode) light, to a level such that poses no practical problem.

FIG. 2 shows another prior art technique disclosed in Japanese Patent Laid-Open No. 352341/1999.

This Japanese Patent Laid-Open No. 352341/1999 proposes that, in a wavelength multiplexing optical communication module, in order to realize good receive characteristics, a cross portion, which crosses a first optical waveguide and a second optical waveguide each other at the end face of an optical waveguide substrate is provided and, in addition, a filter, which reflects light with wavelength λ1 and permits transmission of light with wavelength λ2, is provided at the end face of the optical waveguide substrate.

In these optical communication modules, the structure utilizing folding at a filter can reduce crosstalk light, i.e., light that has leaked from LD light into PD light, to a level which poses no practical problem.

In assembling the above optical communication modules, however, the optical axis of the optical fiber and the optical waveguide should be regulated while monitoring output light, and the troublesome assembling work disadvantageously incurs high assembly cost.

In order to solve this problem of the prior art, a method has been proposed wherein a V groove for a fiber guide is provided in an optical waveguide substrate to facilitate the regulation of the optical axis of the optical fiber and the optical waveguide.

The use of the V groove in the regulation of the optical axis of the optical fiber and the optical waveguide can realize the registration of the optical fiber without the regulation of the optical axis which in turn realizes a reduced assembly cost.

The V groove is generally prepared by removing the (100) crystal face of a wafer by anisotropic etching to form a V-shaped groove of (111) crystal face. Therefore, the direction of the V groove is determined by the axial direction of the wafer crystal.

FIG. 3 is an example of crystal axial direction (<110>axial direction) and mask direction of a wafer 90g in the preparation of a conventional optical waveguide substrate 10.

A V groove 13 in the optical waveguide substrate 10 is formed by removing the (100) crystal face of the wafer 90 by anisotropic etching to form a V-shaped groove having (111) crystal face.

In the conventional production method of a V groove, as shown in FIG. 3, positioning is carried out so that the direction of a mask for preparing a pattern of the optical waveguide substrate 10 is parallel to the crystal axial direction of the wafer 90.

In the same manner as described in the conventional optical communication modules shown in FIGS. 1 and 2, a bent waveguide is used to apply, in the inside of the optical waveguide substrate, an optical signal diagonally to the filter provide perpendicularly to the V groove to perform reflection or transmission of the optical signal.

As described above, the conventional optical communication modules had the following problems.

First, in assembling an optical communication module having a structure adopting folding at a filter, the optical axis of the optical fiber and the optical waveguide should be regulated while monitoring output light, and this work disadvantageously incurs high assembly cost.

Second, in the inside of the optical waveguide substrate, an optical signal is applied diagonally to a filter. This necessitates a bent waveguide.

In the conventional production process of an optical communication module, as shown in FIG. 3, the optical waveguide substrate 10 is masked parallel to the crystal axial direction of the wafer, and, in addition, a filter is provided perpendicularly to the center line of the optical waveguide substrate 10. For this reason, the direction of the V groove 13 formed by anisotropic etching becomes perpendicular to the filter, and a bent waveguide is necessary for diagonally applying the optical signal.

When the waveguide is not straight but has a bend, the optical signal loss occurs. In order to reduce this loss, the radius of curvature of the bent waveguide should be larger than a given dimension. For this reason, a certain length is necessary for the optical waveguide. This makes it impossible to reduce the size of the optical waveguide substrate.

Since the size of the optical waveguide substrate cannot be reduced, the size of the optical communication module cannot also be reduced. For this reason, the production cost of optical communication modules has hitherto been high.

SUMMARY OF THE INVENTION

Accordingly, it is a first object of the invention to solve the above problems of the prior art and to provide an optical communication module, which has a small size and a low production cost and is suitable for mass production, and a process for producing the same.

It is a second object of the invention to solve the above problems of the prior art and to provide an optical communication module, which, through the realization of the formation of a V groove for fiber guide diagonally to a filter, can render a bent waveguide unnecessary and can construct the waveguide by a straight waveguide only to realize a reduction in size of the optical waveguide substrate, and a process for producing the same.

According to the first feature of the invention, an optical communication module for optical signal communication, comprises:

a filter for transmission and reflection of the optical signal;

an optical fiber; and a straight waveguide provided, between the filter and the optical fiber, as a waveguide for communication of the optical signal.

Preferably, a groove for installing the optical fiber is linearly provided, from the end of the waveguide, in the same direction as and parallel to the direction of the optical fiber.

Preferably, a first optical waveguide and a second optical waveguide are provided as the straight waveguide for optical signal communication, the first optical waveguide and the second optical waveguide are provided at respective angles such that an optical signal introduced from the first optical waveguide is reflected from the filter and transmitted to the second optical waveguide and one end of each of the first and second optical waveguides is disposed at a position close to the optical signal reflection point in the filter, and a groove for installing the optical fiber is disposed straightly relative to and in the same direction as the second optical waveguide so as to extend from the end of the second optical waveguide remote from the filter toward the opposite direction of the second optical waveguide.

Preferably, the optical communication module further comprises a receive photodetector for receiving a receive optical signal, and a light-emitting device for sending a send optical signal. In this case, preferably, the first optical waveguide receives the send optical signal sent from the light-emitting device and then sends the optical signal to the filter, the second optical waveguide receives the send optical signal sent through the first optical waveguide and reflected from the filter and sends the optical signal to the optical fiber provided in the groove, and, further, receives the receive optical signal sent through the optical fiber and sends the optical signal to the filter, and the receive photodetector receives the receive optical signal which has been sent from the second optical waveguide and has passed through the filter.

A third waveguide for communication of the receive optical signal may be provided between the filter and the receive photodetector.

In this case, a monitoring photodetector for monitoring the output of the photodetector may be provided behind the light-emitting device.

In the optical communication module according to the first feature of the invention, preferably, the receive optical signal is different from the send optical signal in wavelength, and the filter permits the transmission of the receive optical signal and reflects the send optical signal to perform two-way communication of wavelength division multiplexing.

Preferably, the receive optical signal and the send optical signal are identical to each other in optical signal wavelength, and the filter partially reflects light with the wavelength of the receive optical signal and light with the wavelength of the send optical signal and permits the transmission of a part of these lights to perform two-way communication using optical signals with an identical wavelength.

Preferably, the receive optical signal and the send optical signal are identical to each other in optical signal wavelength, and the filter has a half mirror, for partially reflecting light with the wavelength of the receive optical signal and light with the wavelength of the send optical signal, and permitting the transmission of a part of these lights, and a filter film which permits the transmission of light with the wavelength of the receive optical signal and light with the wavelength of the send optical signal and does not permit the transmission of light with wavelength of input noise light, and the input noise light is cut off to perform two-way communication using optical signals with an identical wavelength.

Preferably, parts in each section for two-way communication are constructed on a chip of the optical waveguide substrate.

Preferably, the groove for installing the optical fiber is formed on the optical waveguide substrate.

Preferably, the groove for installing the optical fiber is formed in a V form in section by anisotropic etching in the optical waveguide substrate.

Preferably, the optical waveguide substrate is in the form of a parallelogram of which the angle of the vertex is not right angle, and the groove and the filter are provided parallel respectively to adjacent two sides of the parallelogram in the optical waveguide substrate.

Preferably, a carrier for mounting the receive photodetector for receiving the receive optical signal is provided and the receive photodetector is mounted within the carrier, which is installed, rather than within the optical waveguide substrate, at a position that receives the receive optical signal which has passed through the filter.

According to a second feature of the invention, an optical communication apparatus provided with an optical communication module for optical signal communication is provided wherein the waveguide for communication of the optical signal provided between the filter for the transmission and reflection of the optical signal and the optical fiber within the optical communication module is a straight waveguide.

Preferably, a groove for installing the optical fiber is linearly provided within the optical communication module, from the end of the waveguide, in the same direction as and parallel to the direction of the optical fiber.

Preferably, a first optical waveguide and a second optical waveguide are provided as the straight waveguide for optical signal communication within the optical communication module, the first optical waveguide and the second optical waveguide are provided at respective angles such that an optical signal introduced from the first optical waveguide is reflected from the filter and transmitted to the second optical waveguide and one end of each of the first and second optical waveguides is disposed at a position close to the optical signal reflection point in the filter, and a groove for installing the optical fiber is disposed straightly relative to and in the same direction as the second optical waveguide so as to extend from the end of the second optical waveguide remote from the filter toward the opposite direction of the second optical waveguide.

According to the third feature of the invention, a process for producing an optical communication module for optical signal communication is provided, wherein a straight waveguide is linearly formed as a waveguide for communication of the optical signal provided between an optical fiber and a filter for the transmission and reflection of an optical signal.

In the production process, preferably, a groove for installing the optical fiber is linearly provided, from the end of the waveguide, in the same direction as and parallel to the direction of the optical fiber.

In the production process, preferably, a first optical waveguide and a second optical waveguide are provided as a straight waveguide for optical signal communication, the first optical waveguide and the second optical waveguide are provided at respective angles such that an optical signal introduced from the first optical waveguide is reflected from the filter and transmitted to the second optical waveguide and one end of each of the first and second optical waveguides is disposed at a position close to the optical signal reflection point in the filter, and a groove for installing the optical fiber is disposed straightly relative to and in the same direction as the second optical waveguide so as to extend from the end of the second optical waveguide remote from the filter toward the opposite direction of the second optical waveguide.

In the production process, preferably, parts in each section for two-way communication are constructed on a chip of the optical waveguide substrate.

In the production process, preferably, the groove for installing the optical fiber is formed on the optical waveguide substrate by anisotropic etching.

In the production process, preferably, the groove for installing the optical fiber is formed in a V form as viewed in section on the optical waveguide substrate.

In the production process, preferably, a mask for forming each chip of the optical waveguide substrate is formed on a wafer diagonally relative to the axial direction of the wafer crystal.

In the production process, preferably, a mask for each chip of the optical waveguide substrate is formed on a wafer in the longitudinal direction along the crystal face orientation of the wafer and in the lateral direction diagonally relative to the crystal face orientation of the wafer and the optical waveguide substrate is formed in a parallelogram form.

In the production process, preferably, a groove for the insertion of the filter and a groove for abutting against the optical fiber provided in each of the optical waveguide substrates are formed at a time for each line of the optical waveguide substrates in the mask of the wafer.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in detail in conjunction with the accompanying drawings.

Figure 1:
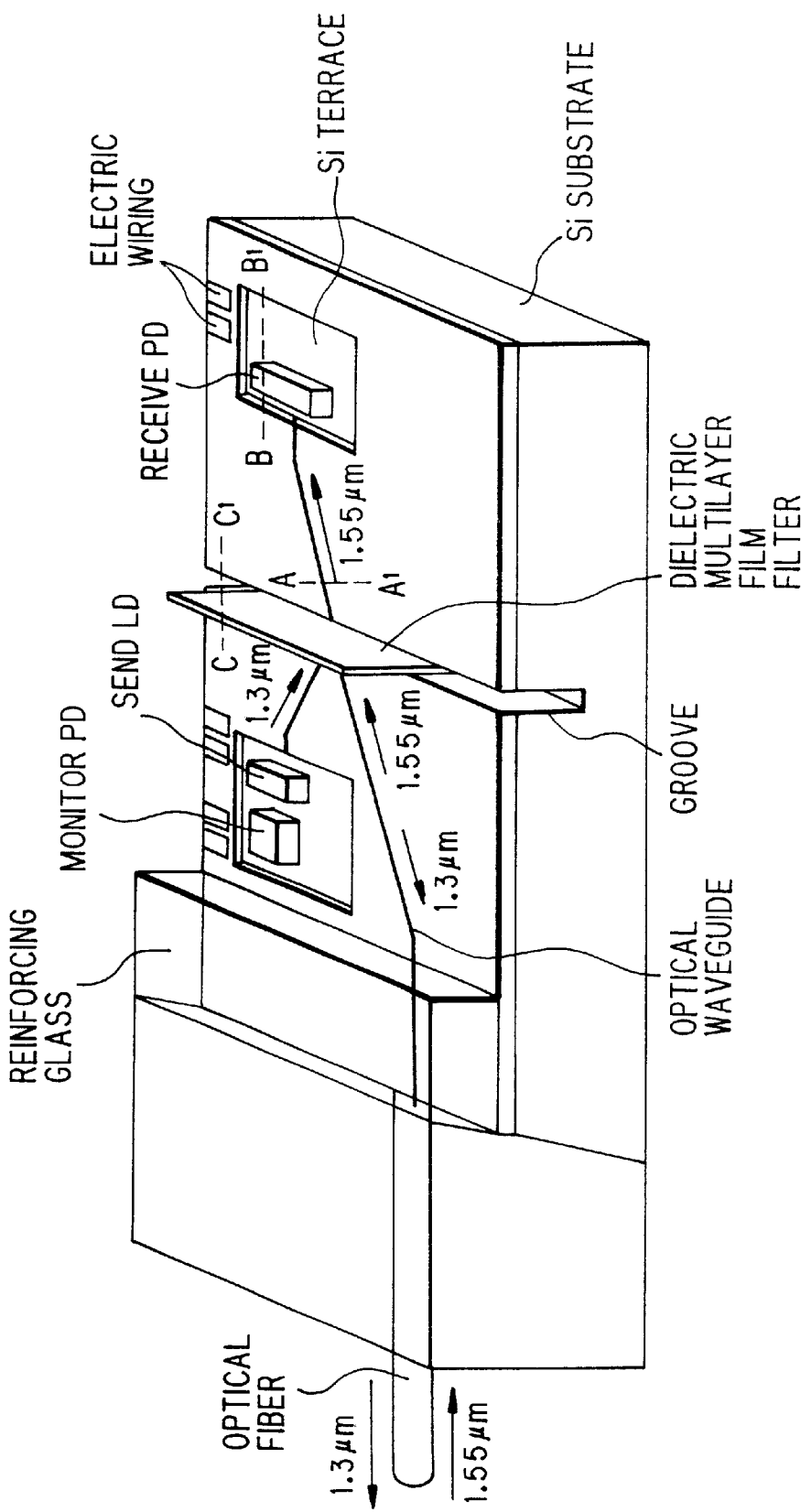
FIG. 1 is a diagram showing an example of the conventional optical communication module.
Figure 2:
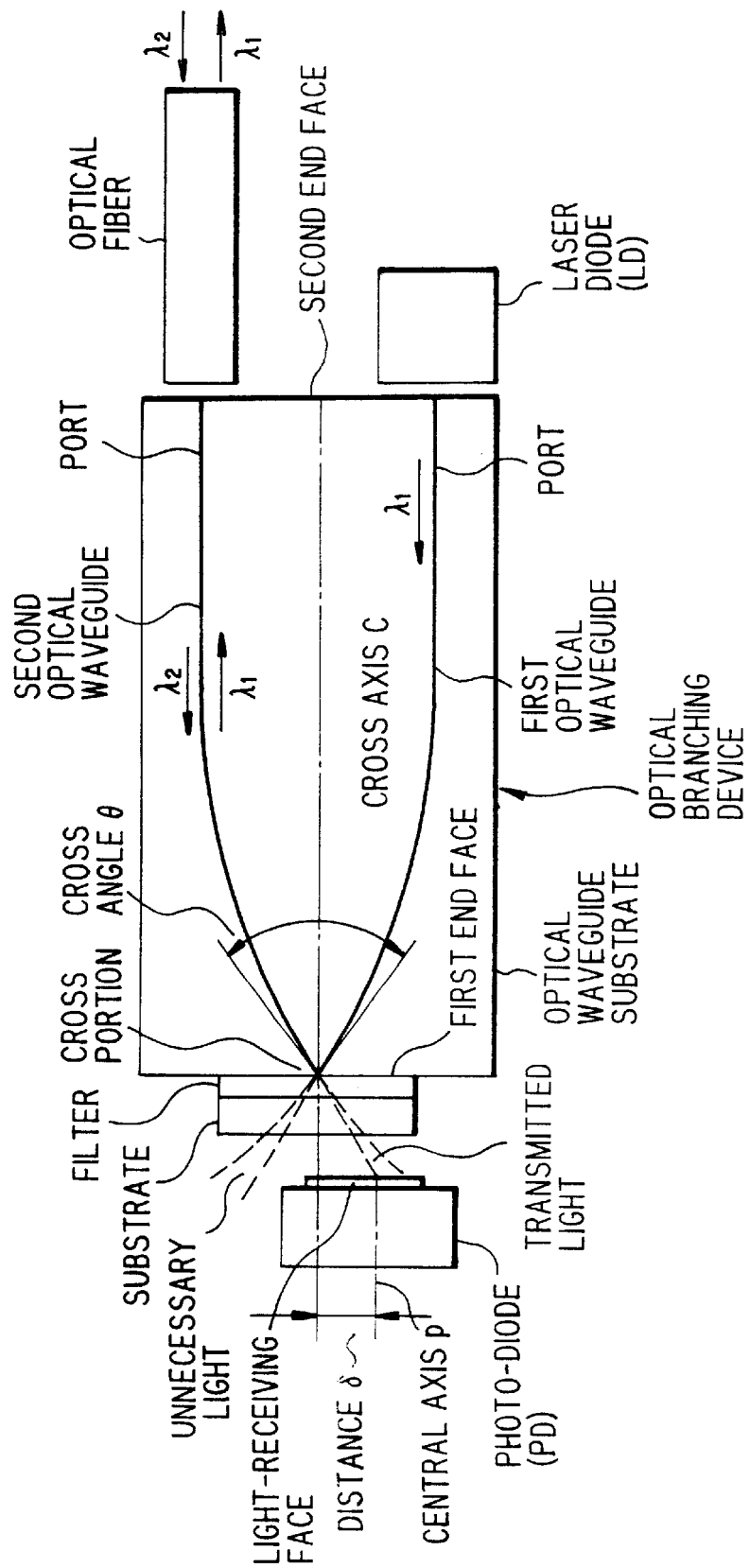
FIG. 2 is a diagram showing another example of the conventional optical communication module.
Figure 3:
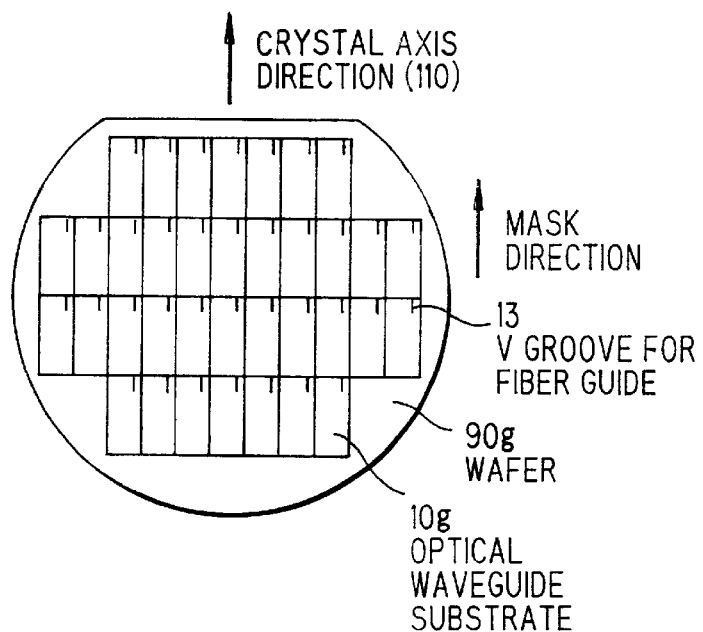
FIG. 3 is a diagram showing an example of conventional mask direction and axial direction of wafer crystal.
Figure 4:
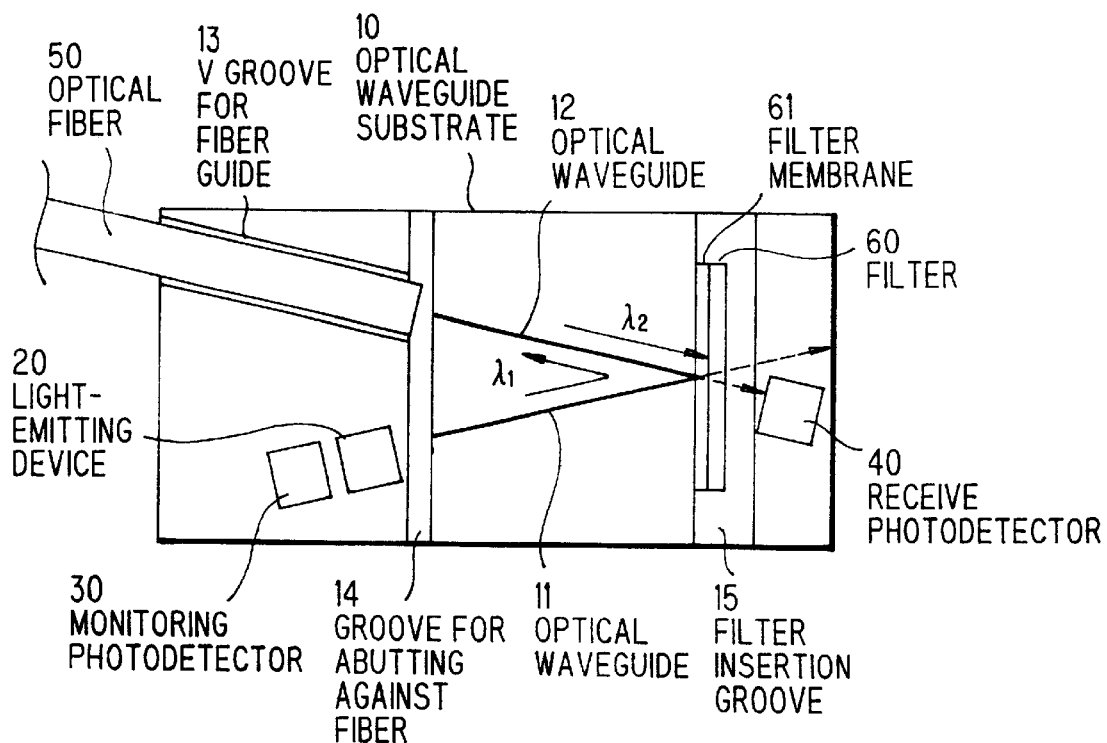
FIG. 4 is a diagram showing the construction of an optical communication module according to a first preferred embodiment of the invention.

FIG. 4 is a diagram showing the construction of an optical communication module according to a first preferred embodiment of the invention.

Referring now to FIG. 4, an optical communication module according to this preferred embodiment comprises an optical waveguide substrate 10, a light-emitting device 20, a monitoring photodetector 30, a receive photodetector 40, and an optical fiber 50, and a filter 60.

In the optical waveguide substrate 10, an optical waveguide 11, an optical waveguide 12, a V groove 13 for a fiber guide, a groove 14 for abutting against a fiber, and a filter insertion groove 15 are provided.

The optical waveguide 11 and the optical waveguide 12 are straight waveguides which are provided symmetrically about the center line of the optical waveguide substrate 10.

The filter insertion groove 15 is provided so that light from the optical waveguide 11 is reflected from the filter 60 and is coupled to the optical waveguide 12. The groove 14 for abutting against a fiber functions also as the formation of the end face of the optical waveguide 11.

The V groove 13 is provided on a prolongation line of the optical waveguide 12, and thus is provided diagonally to the center line of the optical waveguide substrate 10. An optical fiber 50 is inserted into the V groove 13 and is coupled to the optical waveguide 12 without the regulation of the optical axis.

In the optical communication module according to this preferred embodiment, providing the V groove 13 diagonally to the center line of the optical waveguide substrate 10 in this way can eliminate the need to provide a bent waveguide and can provide the optical waveguide 12 as a straight waveguide.

The groove 14 for abutting against an optical fiber and the filter insertion groove 15 can be formed using a dicing saw. The V groove 13 for a fiber guide may be formed by anisotropically etching silicon in such a manner that the optical axis of the optical fiber 50 conforms to the optical axis of the optical waveguide 12.

The light-emitting device 20 for emitting light with wavelength λ1 is disposed so as to be coupled to the optical waveguide 11. The monitoring photodetector 30 is disposed behind the photodetector 20 so as to be coupled to light output from the backside of the light-emitting device 20.

A filter film 61, which reflects light with wavelength λ1 and permits the transmission of light with wavelength λ2, is formed on the filter 60 by vapor deposition. Upon reflection from the filter film 61, light with wavelength λ1 from the optical waveguide 11 is coupled to the optical waveguide 12, and is led through an optical fiber 50 to a transmission line.

The receive photodetector 40 is disposed behind the filter 60 so as to be coupled to light with wavelength λ2 which is incident from the optical waveguide 12 and is passed through the filter film 61.

A waveguide incident photodetector and an end face incident photodetector, which can be easily coupled to the light-emitting device 20 and the optical waveguide 12 are preferably used in the monitoring photodetector 30 and the receive photodetector 40. Further, the provision of a function of folding light by 90 degrees on the optical waveguide substrate enables the use of a surface incident photodetetor and a backside incident photodetector.

Next, the operation of the optical communication module according to this preferred embodiment will be explained.

Light with wavelength λ1 emitted from the light-emitting device 20 is first guided through the optical waveguide 11, is reflected from the filter film 61, is coupled to the optical waveguide 12, and is led through the optical fiber 50 to a transmission line.

The monitoring photodetector 30 receives light output from the backside of the light-emitting device 20 and utilizes this light for controlling the optical output of the light-emitting device 20.

Light with wavelength λ2 introduced from the optical fiber 50 side is guided through the optical waveguide 12, is passed through the filter film 61, and is introduced into and received by the receive photodetector 40.

The optical communication module according to this preferred embodiment sends light with wavelength λ1 and receives light with wavelength λ2 through the above operation.

Next, a method for forming, diagonally to the center line of the optical waveguide substrate 10, the V groove 13 for a fiber guide in the optical communication module according to this preferred embodiment will be described.

Figure 5:
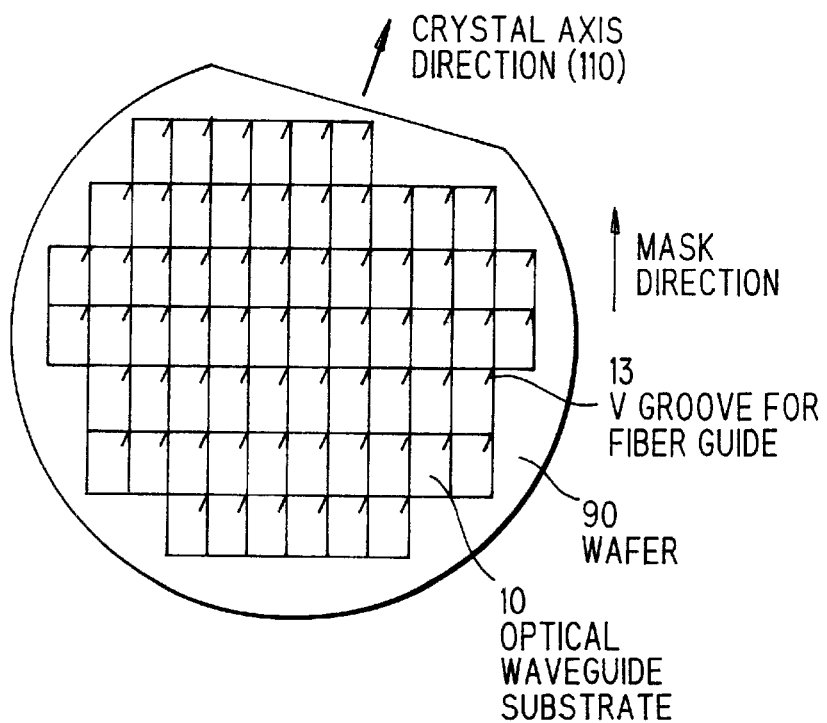
FIG. 5 is a diagram showing an embodiment of mask direction and axial direction of wafer crystal according to the first preferred embodiment of the invention.

In the optical communication module according to the invention, as shown in FIG. 5, the V groove 13 is prepared diagonally to the center line of the optical waveguide substrate 10 by positioning the direction of a mask, for previously preparing a pattern of the optical guide substrate 10, diagonally to the crystal axial direction (<110> axial direction) of the wafer 90.

Figure 6:
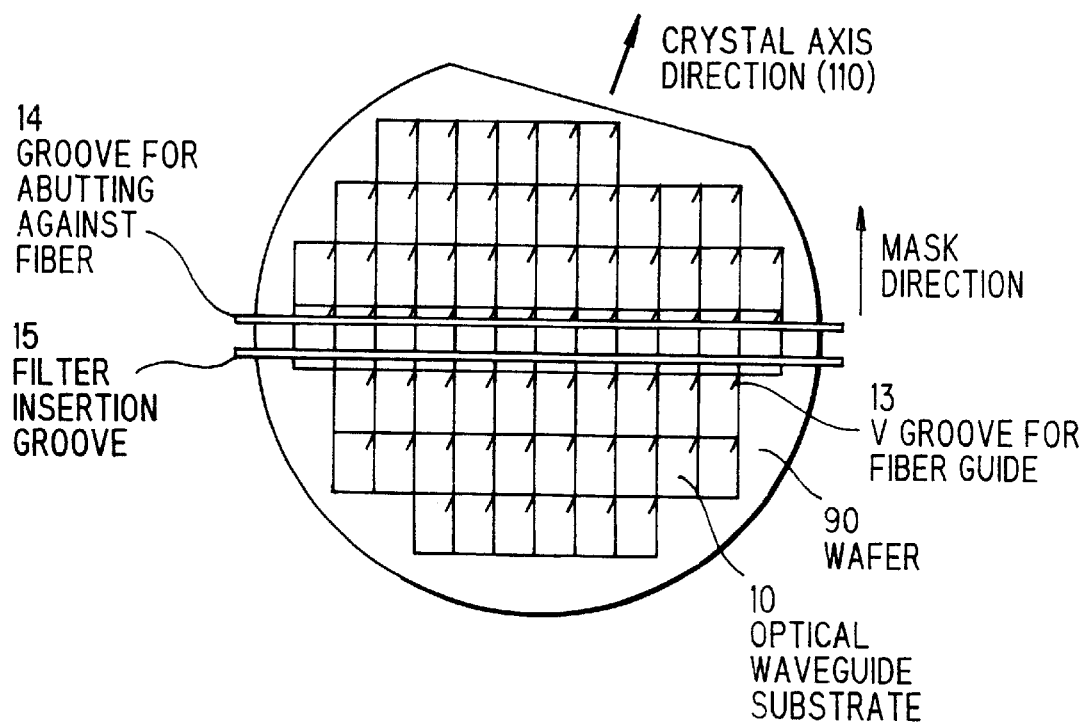
FIG. 6 is a diagram illustrating the preparation of a groove for abutting against a fiber and the preparation of a filter insertion groove according to the first preferred embodiment of the invention.

Further, since the groove 14 for abutting against the fiber and the filter insertion groove 15 may be formed perpendicularly to the center line of the optical waveguide substrate 10, as shown in FIG. 6, the groove can be easily formed by means of a dicing saw in the wafer 90 per se.

In this preferred embodiment, in FIGS. 5 and 6, as with conventional wafers, the wafer 90 is in a disk form and has a notch called orientation flat in one end in the crystal axial direction. The form of the wafer, however, is not limited to this, and, likewise, also in other forms, an optical communication module can be produced by the above production process. Further, also in the material of the wafer 90, the optical communication module according to the present preferred embodiment can be produced for example, by using silicon or other various materials, for example, compound semiconductors, such as GaAs or InP.

In the optical communication module and the production process thereof according to the present preferred embodiment, a V groove for a fiber guide can be formed diagonally, rather than perpendicularly to the filter, to the center line of the optical waveguide substrate 10.

This eliminates the need to provide a bent waveguide, and the waveguide can be constructed by the straight waveguide only. Therefore, for example, a reduction in size of the optical waveguide substrate and the optical communication module per se, a reduction in production cost, and the elimination of bending loss of signal light can be realized.

Further, since there is no need to form, one by one, the groove 14 for abutting against the fiber and the filter insertion groove 15 after cutting the waveguide substrate 10, the groove production cost can be significantly reduced.

Next, other preferred embodiments of the invention will be explained in detail in conjunction with the accompanying drawings.

Figure 7:
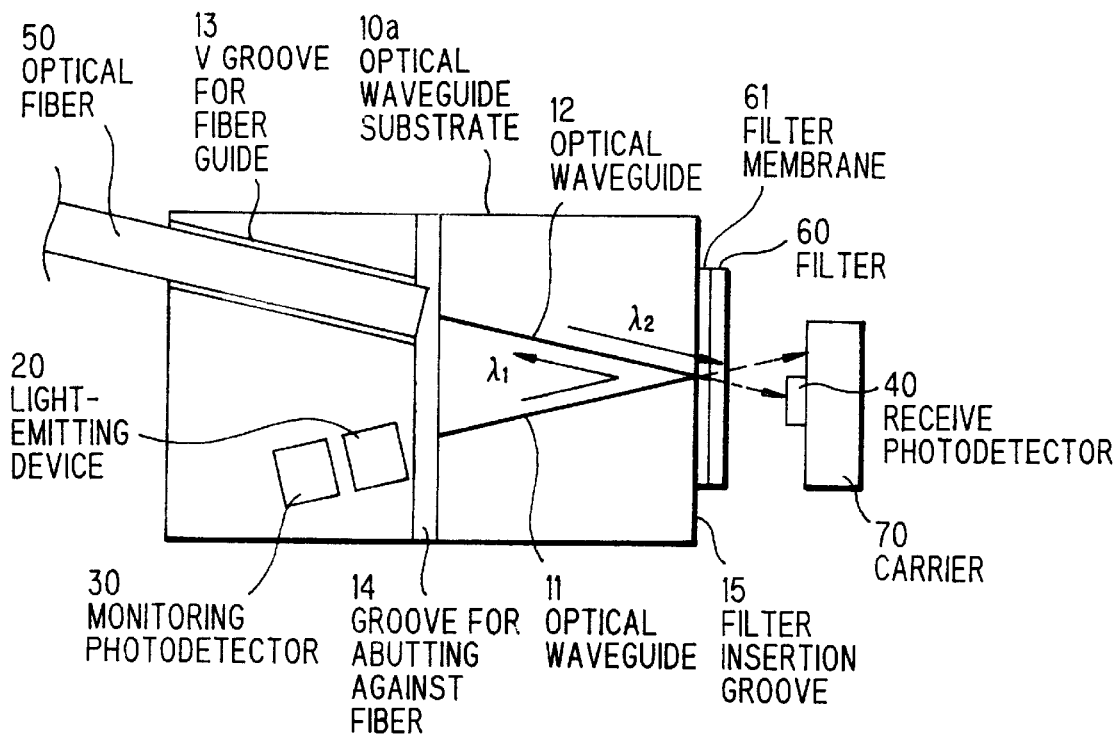
FIG. 7 is a diagram showing the construction of an optical communication module according to a second preferred embodiment of the invention.

FIG. 7 is a diagram showing the construction of an optical communication module according to the second preferred embodiment of the invention.

Referring to FIG. 7, unlike the first preferred embodiment wherein the receive photodetector 40 is mounted on the optical waveguide substrate 10, in the optical communication module according to this preferred embodiment, the receive photodetector 40 is mounted on a carrier 70 and is then disposed behind the filter 60 so as to be coupled to the optical waveguide 12.

Therefore, by virtue of a structure wherein the receive photodetector 40 is mounted on the carrier 70, the optical communication module according to this preferred embodiment has, in addition to the effect of the first preferred embodiment, an advantage that a surface incident photodetector and a backside incident photodetector may be used in the receive photodetector 40 without the provision of a function of folding light by 90 degrees on the optical waveguide substrate 10.

Figure 8:
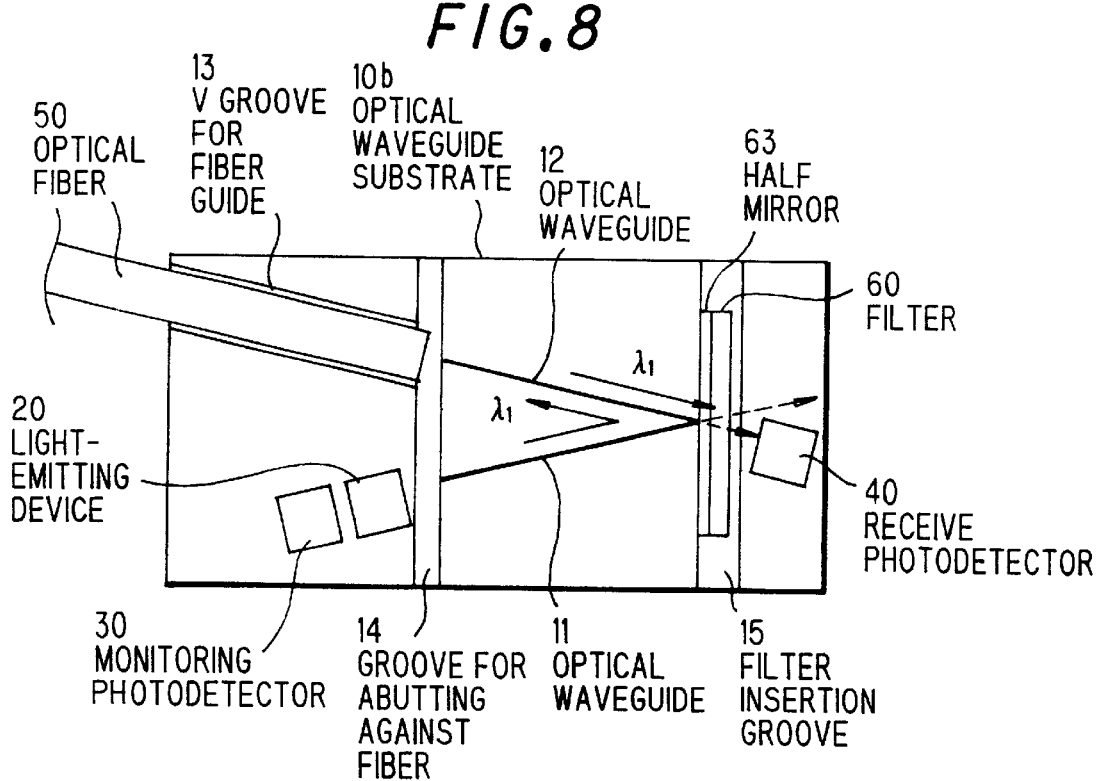
FIG. 8 is a diagram showing the construction of an optical communication module according to a third preferred embodiment of the invention.

FIG. 8 is a diagram showing the construction of an optical communication module according to a third preferred embodiment of the invention.

In this preferred embodiment, unlike the first and second preferred embodiments where optical signals with different wavelengths are used in send/receive, an optical signal with an identical wavelength is used in send/receive.

Referring now to FIG. 8, in the optical communication module according to this preferred embodiment, unlike a system wherein the filter film 61, which reflects light with wavelength λ1 and permits the transmission of light with wavelength λ2, is vapor deposited on the filter 60, a half mirror 63, which reflects the half of light with wavelength λ1 and permits the transmission of the remaining half of the light, is vapor deposited on the filter 60.

A send optical signal with wavelength λ1 emitted from the light-emitting device 20 is guided through the optical waveguide 11, is reflected from the half mirror 63, is coupled to the optical waveguide 12, and is led through the optical fiber 50 to the transmission line.

A receive optical signal with wavelength λ1 introduced through the optical fiber 50 is guided through the optical waveguide 12, is passed through the half mirror 63, and is incident on the receive photodetector 40.

Thus, the provision of the half mirror 63 on the filter 60 by vapor deposition can provide an optical communication module which sends/receives light with identical wavelength λ1. Further, as with each of the above preferred embodiments, the provision of a bend waveguide is unnecessary and the waveguide can be constructed by the straight waveguide only. This can realize a reduction in size of the optical waveguide substrate and the optical communication module per se and a reduction in production coat. There is no need to form the groove one by one after cutting the waveguide substrate 10, and, thus, a reduction in production cost of the groove can be realized.

Figure 9:
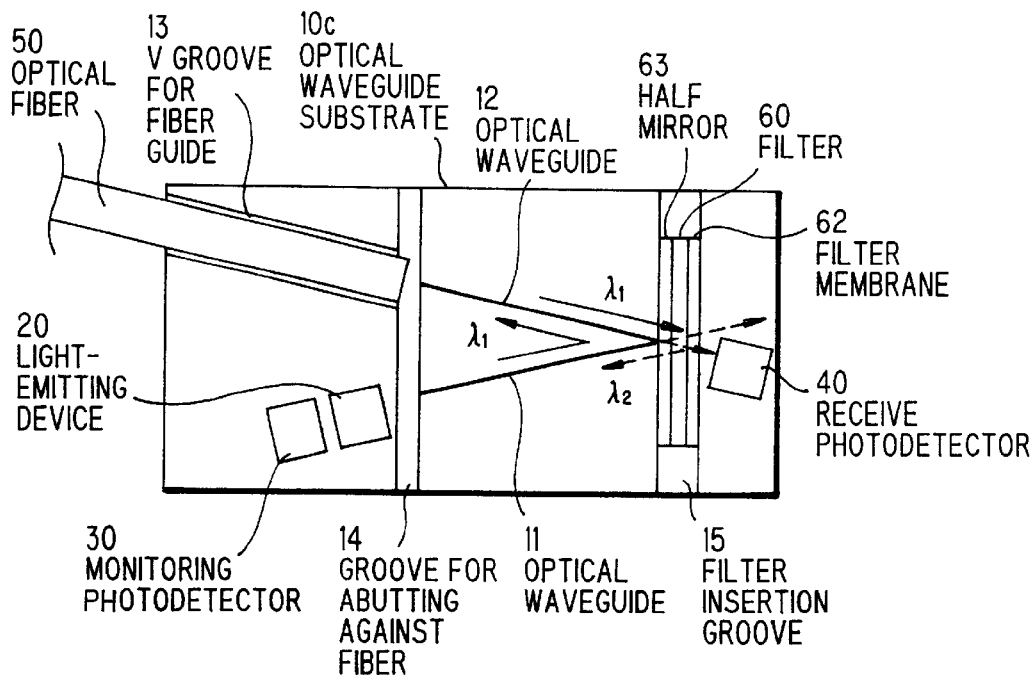
FIG. 9 is a diagram showing the construction of an optical communication module according to a fourth preferred embodiment of the invention.

FIG. 9 is a diagram showing the construction of an optical communication module according to a fourth preferred embodiment of the invention.

Referring now to FIG. 9, in the optical communication module according to this preferred embodiment, the half mirror 63, which reflects the half of light with wavelength λ1 and permits the transmission of the remaining half of light, is vapor deposited on the filter 60, and the filter film 62, which permits the transmission of light with wavelength λ1 and reflects light with wavelength λ2, is vapor deposited on the filter 60 in its side remote from the half mirror 63.

A send optical signal with wavelength λ1 emitted from the light-emitting device 20 is guided through the optical waveguide 11, is reflected from the half mirror 63, is coupled to the optical waveguide 12, and is led through the optical fiber 50 to the transmission line.

A receive optical signal with wavelength λ1 introduced through the optical fiber 50 is guided through the optical waveguide 12, is passed through the half mirror 63 and the filter film 62, and is incident on the receive photodetector 40.

Light with wavelength λ2, that is noise light which has gotten mixed within the optical fiber 50, is guided through the optical waveguide 12 and is transmitted through the half mirror 63. This light, however, is reflected from the filter film 62, and, thus, is not incident on the receive photodetector 40.

Thus, the provision of the half mirror 63 for light with wavelength λ1 on one side of the filter 60 by vapor deposition and the provision of the filter film 62, which permits the transmission of light with wavelength λ1 and reflects light with wavelength λ2, by vapor deposition on the other side of the filter 60 can realize, as with the third preferred embodiment, send/receive of signal light with wavelength λ1 and, at the same time, can realize the function of cutting-off the input noise light.

In the optical communication module according to this preferred embodiment, the vapor deposition of a film having both the function of the half mirror 63 and the function of the filter film 62 on one side of the filter 60 can attain the same effect.

Figure 10:
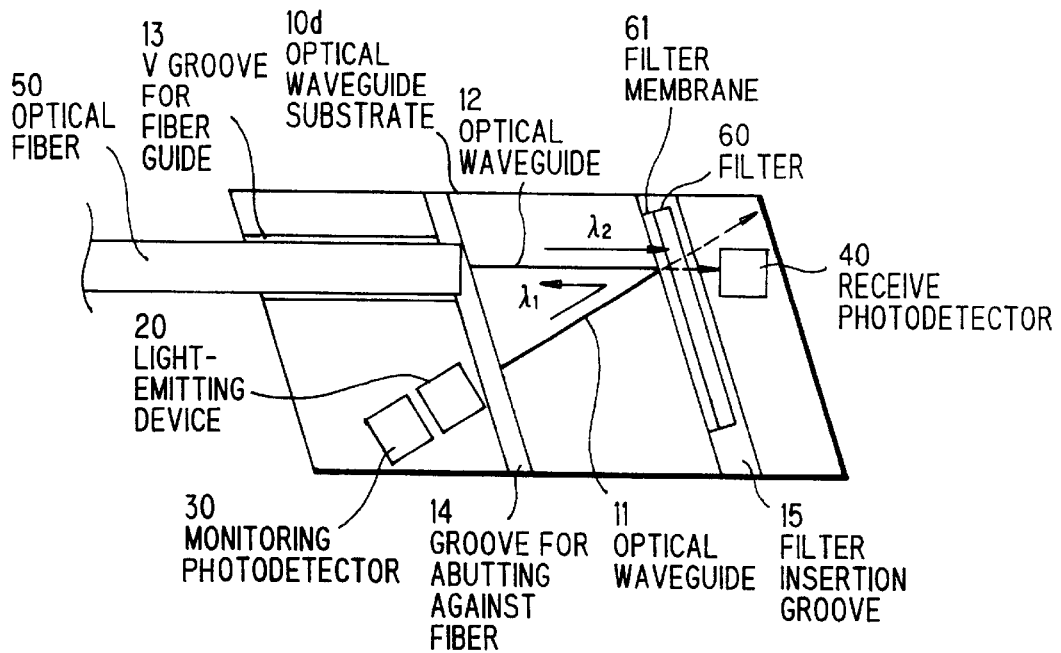
FIG. 10 is a diagram showing the construction of an optical communication module according to a fifth preferred embodiment of the invention.

FIG. 10 is a diagram showing the construction of an optical communication module according to the fifth preferred embodiment of the invention.

Referring now to FIG. 10, the optical communication module according to this preferred embodiment is constructed so that the V groove 13 is parallel to the center line of the optical waveguide substrate 10 by cutting the optical waveguide substrate 10 into a parallelogrammatic shape.

Figure 11:
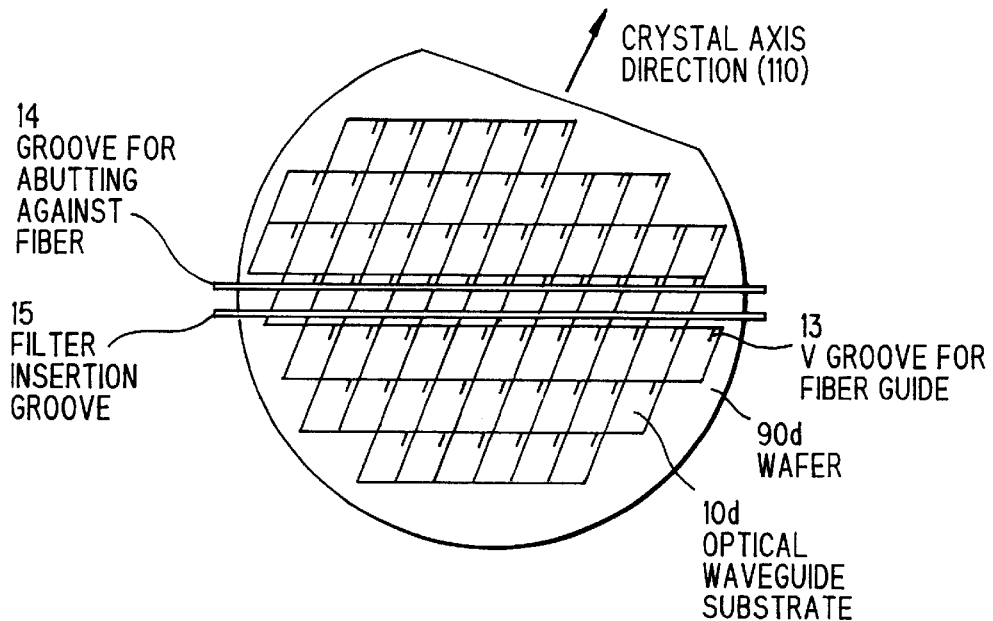
FIG. 11 is a diagram showing an embodiment of mask direction and axial direction of wafer crystal according to the fifth preferred embodiment of the invention.

FIG. 11 is a diagram showing an embodiment of mask direction and axial direction of wafer crystal according to the fifth preferred embodiment of the invention.

As shown in FIG. 11, the V groove 13 can be made parallel to the center line of the optical waveguide substrate 10 by cutting the optical waveguide substrate 10 in a direction parallel to the crystal axis direction of the wafer 90.

The above-described optical communication module according to this preferred embodiment can realize the same effect as attained in the first preferred embodiment. In addition, the V groove 13 can be made parallel to the center line of the optical waveguide substrate 10. Therefore, in mounting the optical waveguide substrate 10 on a package for mounting the optical waveguide substrate, there is no need to diagonally mount the optical waveguide substrate 10 according to the direction of the outlet of the fiber. Thus, the optical waveguide substrate 10 can be mounted parallel to the fiber. This can realize a further reduction in size of the optical communication module, The optical communication module according to this preferred embodiment can also be combined with the construction of the second, third, and fourth preferred embodiments. That is, also in each of the preferred embodiments, the adoption of a parallelogrammatic shape in the optical waveguide substrate 10 as in the case of this preferred embodiment can more easily attain the effect of the present preferred embodiment, that is, the mounting of the optical waveguide substrate 10 so as to be parallel to the fiber.

Figure 12:
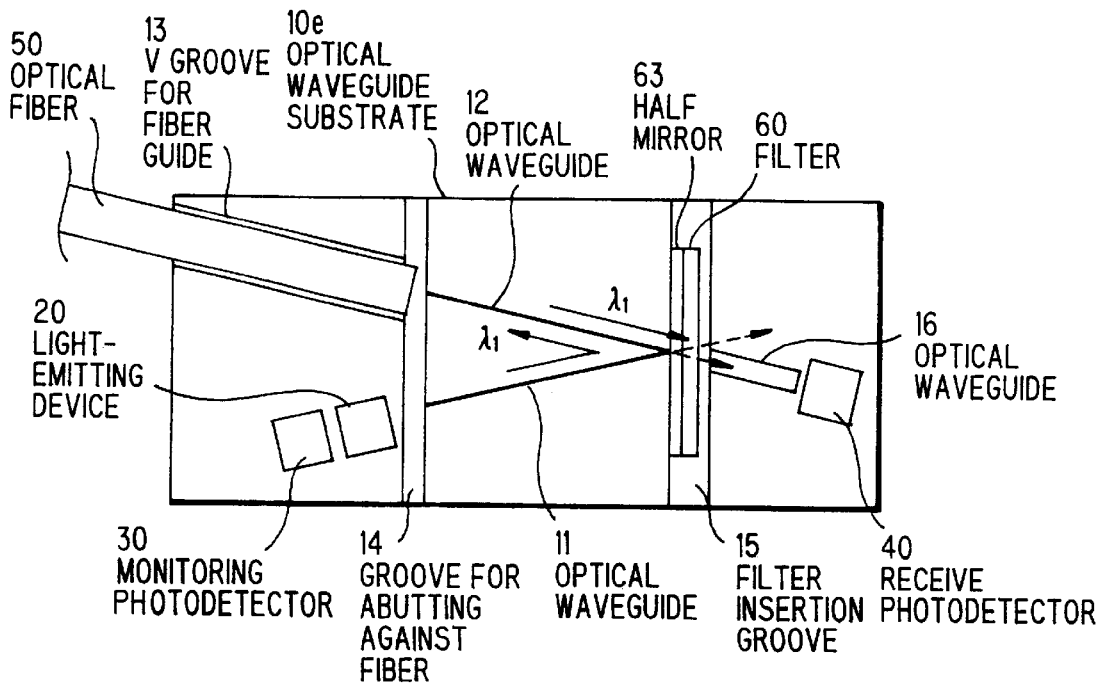
FIG. 12 is a diagram showing the construction of an optical communication module according to a sixth preferred embodiment of the invention.

FIG. 12 is a diagram showing the construction of an optical communication module according to the sixth preferred embodiment of the invention.

Referring now to FIG. 12, in the optical communication module according to this preferred embodiment, an optical waveguide 16 is also provided between the filter 60 and the receive photodetector 40 to permit a receive optical signal, which has been passed through the filter 60, to lead to the photodetector 40. The diameter within the optical waveguide 16 is made larger than the optical waveguide 12 on the opposite side of the filter 60 so that the receive optical signal can be easily introduced into the optical waveguide 16.

The optical signal is scattered in various directions and there are many noise lights on the filter 60 in its points where the optical signal is reflected or transmitted. In the optical communication module according to the present preferred embodiment shown in FIG. 12, the provision of the optical waveguide 16 prevents the send optical signal, from the light-emitting device 20, from entering the receive photodetector 40 side, and only the receive optical signal can be efficiently received.

Figure 13:
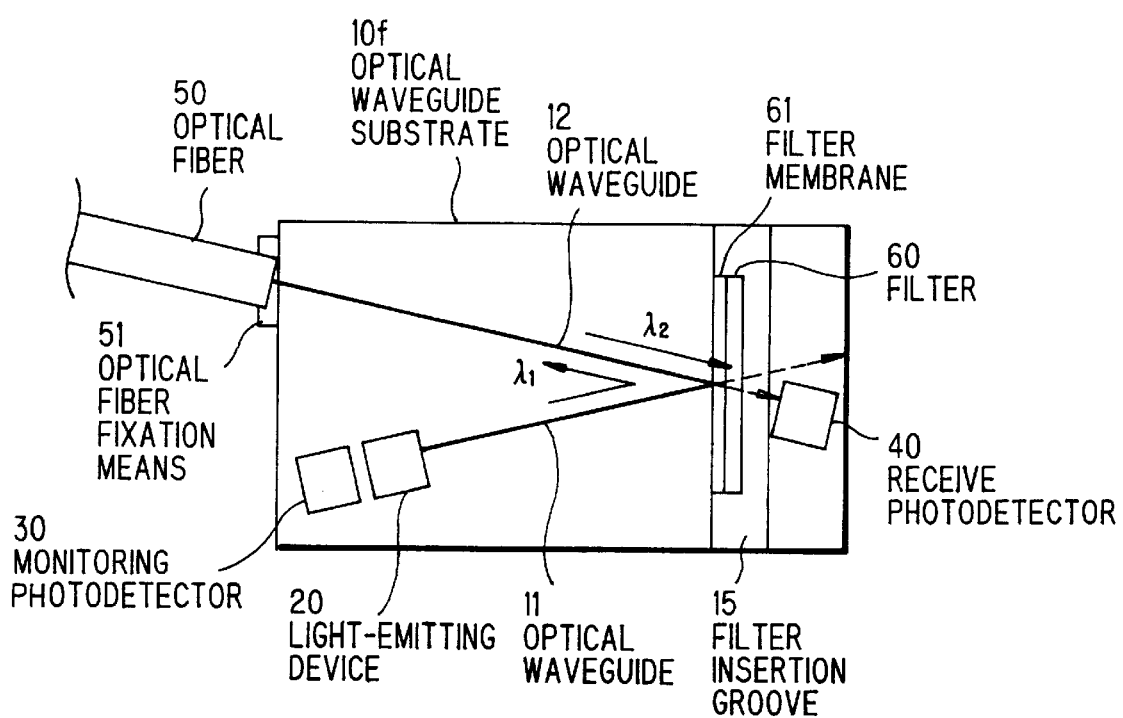
FIG. 13 is a diagram showing the construction of an optical communication module according to a seventh preferred embodiment of the invention.

FIG. 13 is a diagram showing the construction of an optical communication module according to the seventh preferred embodiment of the invention. In this preferred embodiment, the optical fiber 50 is not installed within the optical waveguide substrate 10, and, instead, the optical fiber 50 is installed by providing fixation means 51 for the optical fiber 50 at the end of the optical waveguide substrate 10.

In the above preferred embodiments, the installation of the optical fiber 50 within the optical waveguide substrate 10, for example, by a method using the V groove 13 has been explained. However, also in the connection of the optical fiber 50 to the end of the optical waveguide substrate 10 according to the present preferred embodiment, the preparation of an optical communication module by straight waveguides 11, 12 only free from any bending waveguide can realize, for example, a reduction in the size of the optical communication module, the elimination of bending loss, and a reduction in production cost.

In addition to the methods described in the above preferred embodiments, such as a method wherein the send/receive of optical signals with different wavelengths is carried out and a method wherein the send/receive of optical signals with an identical wavelength is carried out, it is also possible to adopt a method wherein only the receive of optical signals with different wavelengths is carried out and a method wherein only the send of optical signals with different wavelengths is carried out. That is, rather than the use of the light-emitting device 20 and the receive photodetector 40 according to the above-described preferred embodiments, the provision of an additional one receive photodetector instead of the light-emitting device 20 and, likewise, the provision of an additional one light-emitting device 20 instead of the receive photodetector 40 can realize an optical communication module for performing the above communication and can attain the same effect as described in the above preferred embodiments.

Further, each of the above preferred embodiments may be combined in various ways to realize the above effects.

The invention has been described with reference to preferred embodiments and examples. However, it should be noted that the invention is not limited to the above preferred embodiments and examples and various variations and modifications can be effected within the scope of the technical idea of the invention.

As is apparent from the foregoing description, the optical communication module and production process according to the invention can provide the following effects.

First, the production process of an optical communication module according to the invention can realize an optical communication module wherein the waveguide is constructed by a straight waveguide only.

This is attributable to the following facts. In the prior art, an optical fiber has been installed parallel to the center line of the optical waveguide substrate. Therefore, in order to reflect signal light diagonally with respect to the to filter provided perpendicularly to the center line of the optical waveguide substrate, a bent waveguide should be provided. In the optical communication module according to the invention, however, providing the V groove, for a fiber guide provided with an optical fiber, diagonally to the center line of the optical waveguide substrate can realize the construction of the waveguide by a straight waveguide only.

Further, the construction of the waveguide by a straight waveguide only can remove the bending loss of the signal light and thus can realize low-loss, high-quality communication. Furthermore, the provision of a bent waveguide requiring a large space within the optical waveguide substrate becomes unnecessary, and, thus, the construction of an optical waveguide substrate using a straight waveguide can be realized in a much smaller space. This contributes to a reduction in size of the optical waveguide substrate. Furthermore, the reduction in size of the optical waveguide substrate can realize a reduction in size of the whole optical communication module, and the production process of the invention could have realized an optical communication module having a size which is at least 501% smaller than the conventional optical communication module.

Second, the production process of an optical communication module according to the invention can realize a reduction in production cost of the optical communication module.

The reduction in size of the optical waveguide substrate can increase the yield of the optical waveguide substrate which can be obtained from one wafer. This can reduce the cost of the production of one optical waveguide substrate. For example, when the size of the optical waveguide substrate has been halved, the production cost of the optical waveguide substrate can be halved.

The application of the V groove for a fiber guide can eliminate the need to perform optical axis regulation while monitoring the optical output. This can reduce the assembly cost.

Third, in the production process of an optical communication module according to the invention, common use of parts and assembly equipment for the production of various optical communication module described in the above preferred embodiments can be realized.

In the optical communication module according to the invention, merely selecting the type of filters for insertion into the optical waveguide substrate can realize various forms of functions, such as a system which sends light with wavelength $\lambda 1$ and receives light with different wavelength $\lambda 2$, a system which sends and receives light with identical wavelength $\lambda 1$, and a system which receives or sends both light with wavelength $\lambda 1$ and light with different wavelength $\lambda 2$. For all other parts, such as an optical waveguide substrate, a light emitting device, a monitoring photodetector, and a receive photodetector, common use is possible.

The realization of common use of parts can facilitate the management of parts, can realize efficient production, and can realize common use of assembly equipment.

The invention has been described in detail with particular reference to preferred embodiments, but it will be understood that variations and modifications can be effected within the scope of the invention as set forth in the appended claims.

What is claimed is:

1. An optical communication module for optical signal communication, comprising:
    an optical waveguide substrate;
    a filter for transmission and reflection of the optical signal;
    an optical fiber;
    a straight waveguide formed on the substrate, provided between the filter and the optical fiber, as a waveguide for communication of the optical signal; and
    a groove formed on the substrate for reception of the optical fiber, wherein the groove is positioned diagonally to the axial center line of the substrate.

2. The optical communication module according to claim 1, wherein a groove for installing the optical fiber is linearly provided, from the end of the waveguide, in the same direction as and parallel to the direction of the optical fiber.

3. The optical communication module according to claim 1, wherein
    a first optical waveguide and a second optical waveguide are provided as the straight waveguide for optical signal communication,
    the first optical waveguide and the second optical waveguide are provided at respective angles such that an optical signal introduced from the first optical waveguide is reflected from the filter and transmitted to the second optical waveguide and one end of each of the first and second optical waveguides is disposed at a position close to the optical signal reflection point in the filter, and
    a groove for installing the optical fiber is disposed straightly relative to and in the same direction as the second optical waveguide so as to extend from the end of the second optical waveguide remote from the filter toward the opposite direction of the second optical waveguide.

4. The optical communication module according to claim 3, which further comprises
    a receive photodetector for receiving a receive optical signal and
    a light-emitting device for sending a send optical signal, and wherein
    the first optical waveguide receives the send optical signal sent from the light-emitting device and then sends the optical signal to the filter,
    the second optical waveguide receives the send optical signal sent through the first optical waveguide and reflected from the filter and sends the optical signal to the optical fiber provided in the groove, and, further, receives the receive optical signal sent through the optical fiber and sends the optical signal to the filter, and
    the receive photodetector receives the receive optical signal which has been sent from the second optical waveguide and has passed through the filter.

5. The optical communication module according to claim 4, wherein a third waveguide for communication of the receive optical signal is provided between the filter and the receive photodetector.

6. The optical communication module according to claim 4, wherein a monitoring photodetector for monitoring the output of the photodetector is provided behind the light-emitting device.

7. The optical communication module according to claim 4, wherein the receive optical signal is different from the send optical signal in wavelength, and
    the filter permits the transmission of the receive optical signal and reflects the send optical signal to perform two-way communication of wavelength division multiplexing.

8. The optical communication module according to claim 4, wherein the receive optical signal and the send optical signal are identical to each other in optical signal wavelength, and
the filter partially reflects light with the wavelength of the receive optical signal and light with the wavelength of the send optical signal and permits the transmission of a part of these lights to perform two-way communication using optical signals with an identical wavelength.

9. The optical communication module according to claim 4, wherein the receive optical signal and the send optical signal are identical to each other in optical signal wavelength, and
the filter includes a half mirror, for partially reflecting light with the wavelength of the receive optical signal and light with the wavelength of the send optical signal, and permitting the transmission of a part of these lights, and a filter film which permits the transmission of light with the wavelength of the receive optical signal and light with the wavelength of the send optical signal and does not permit the transmission of light with wavelength of input noise light, and
the input noise light is cut off to perform two-way communication using optical signals with an identical wavelength.

10. The optical communication module according to claim 1, wherein parts in each section for two-way communication are constructed on a chip of the optical waveguide substrate.

11. The optical communication module according to claim 10, wherein the groove for installing the optical fiber is formed on the optical waveguide substrate.

12. The optical communication module according to claim 10, wherein
a carrier for mounting the receive photodetector for receiving the receive optical signal is provided, and
the receive photodetector is mounted within the carrier, which is installed, rather than within the optical waveguide substrate, at a position that receives the receive optical signal which has passed through the filter.

13. The optical communication module according to claim 1, wherein the groove for reception of the optical fiber is formed in a V form as viewed in section by anisotropic etching in the optical waveguide substrate.

14. The optical communication module according to claim 1, wherein the optical waveguide substrate is in the form of a parallelogram of which the angle of the vertex is not right angle, and
the groove and the filter are provided parallel respectively to adjacent two sides of the parallelogram in the optical waveguide substrate.

15. The optical communication module of claim 1, wherein the groove is provided on a prolongation line of the straight waveguide.

16. A process for producing an optical communication module for optical signal communication, comprising:
forming a groove in an optical waveguide substrate that receives an optical fiber, wherein the groove is positioned diagonally to the axial center line of the substrate; and
forming a straight waveguide is linearly formed as a waveguide, on the substrate as a waveguide for communication of the optical signal provided between an optical fiber and a filter for the transmission and reflection of the optical signal.

17. The process according to claim 16, wherein the forming of a groove is linearly provided, from the end of the waveguide, in the same direction as and parallel to the direction of the optical fiber.

18. The process according to claim 16, wherein the forming of a straight waveguide further comprises forming a first optical waveguide and a second optical waveguide are provided as a straight waveguide for optical signal communication, wherein the first optical waveguide and the second optical waveguide are provided at respective angles such that an optical signal introduced from the first optical waveguide is reflected from the filter and transmitted to the second optical waveguide and one end of each of the first and second optical waveguides is disposed at a position close to the optical signal reflection point in the filter, and
the groove for reception of the optical fiber is disposed straightly relative to and in the same direction as the second optical waveguide so as to extend from the end of the second optical waveguide remote from the filter toward the opposite direction of the second optical waveguide.

19. The process according to claim 16, wherein parts in each section for two-way communication are constructed on a chip of the optical waveguide substrate.

20. The process according to claim 19, wherein the groove for installing the optical fiber is formed on the optical waveguide substrate by anisotropic etching.

21. The process according to claim 19, wherein the groove for installing the optical fiber is formed in a V form as viewed in section on the optical waveguide substrate.

22. The process according to claim 19, wherein a groove for the insertion of the filter and a groove for abutting against the optical fiber provided in each of the optical waveguide substrates are formed at a time for each line of the optical waveguide substrates in the mask of the wafer.

23. The process according to claim 16, further comprising forming a mask for each chip of the optical waveguide substrate on a wafer in the longitudinal direction along the crystal face orientation of the wafer and in the lateral direction diagonally relative to the crystal face orientation of the wafer and the optical waveguide substrate is formed in a parallelogram form.

24. The process according to claim 16, further comprising forming a mask for forming each chip of the optical waveguide substrate on a wafer relative to the axial direction of the wafer crystal.

25. An optical communication module for optical signal communication, comprising:
a filter for transmission and reflection of the optical signal;
an optical fiber;
a straight waveguide provided between the filter and the optical fiber as a waveguide for communication of the optical signal; and
a groove formed on the substrate for reception of the optical fiber,
wherein the optical waveguide substrate is in the form of a parallelogram of which the angle of the vertex is not a right angle, the groove and the filter are provided parallel respectively to adjacent two sides of the parallelogram in the optical waveguide substrate, and
wherein parts in each section for two-way communication are constructed on a chip of optical waveguide substrate.

26. The optical communication module of claim 25, wherein the groove for reception of the optical fiber is linearly provided, from the end of the waveguide, in the same direction as and parallel to the direction of the optical fiber.

27. The optical communication module for optical signal communication of claim 25, wherein the groove is positioned diagonally to the axial center line of the substrate.

* * * * *